July 31, 1928.
A. ABRAMSON
1,678,757
POWER TRANSMISSION MECHANISM FOR THE DRIVING WHEELS OF MOTOR VEHICLES
Filed April 18, 1927
2 Sheets-Sheet 1
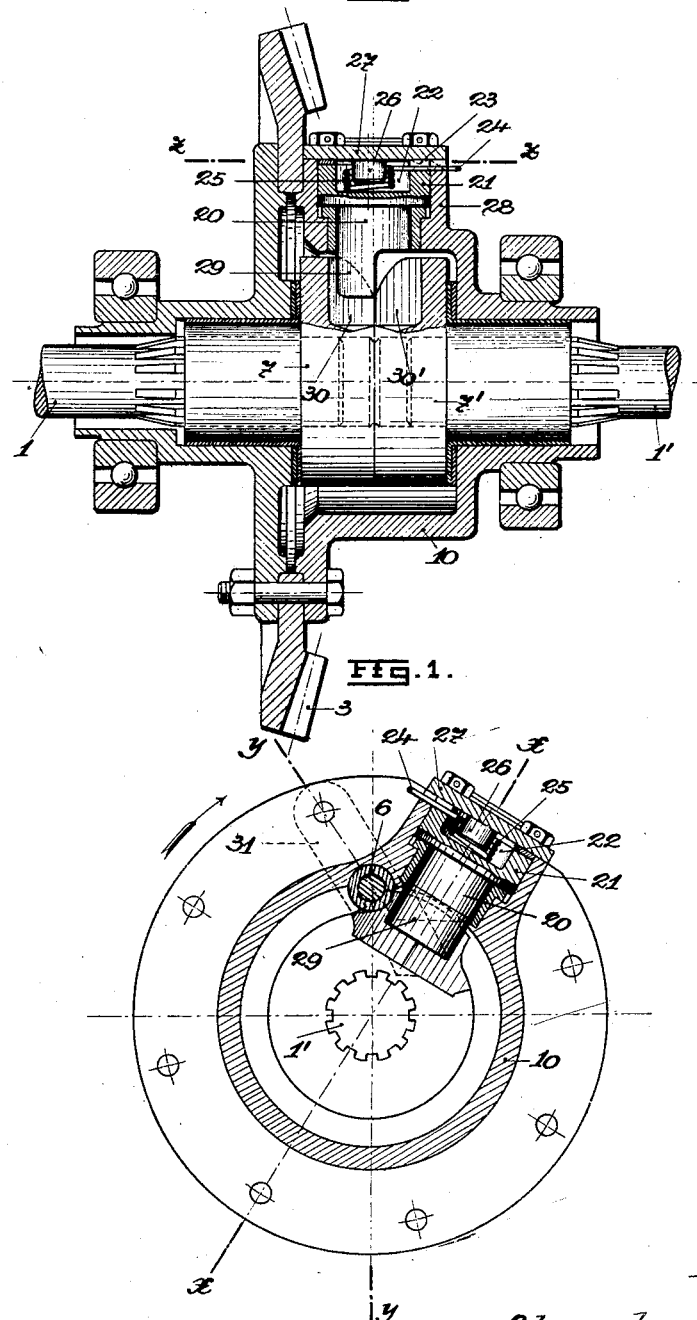
Inventor:
Alexander Abramson July 31, 1928.
A. ABRAMSON
1,678,757
POWER TRANSMISSION MECHANISM FOR THE DRIVING WHEELS OF MOTOR VEHICLES
Filed April 18, 1927  2 Sheets-Sheet 2
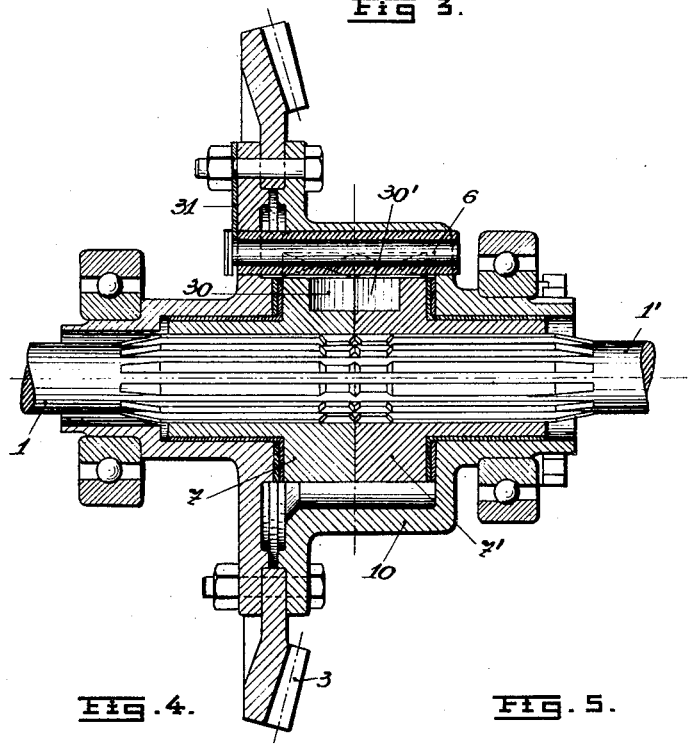
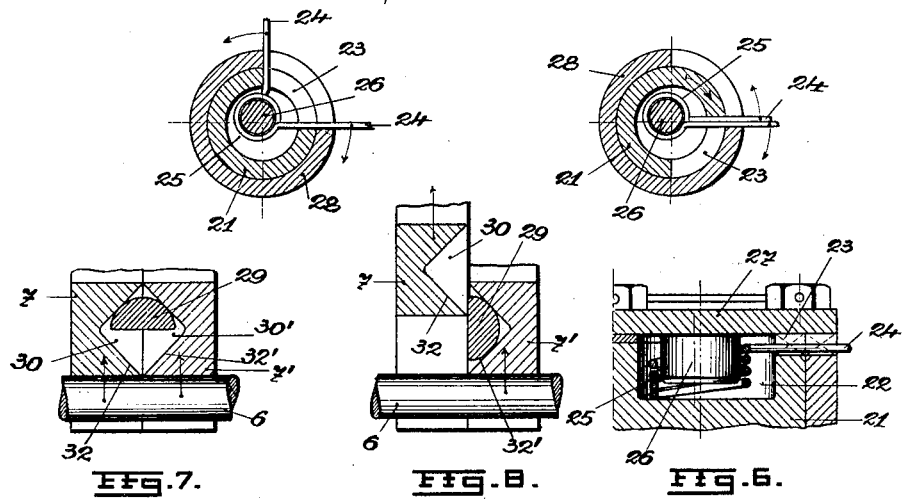
Inventor:
Alexander Abramson
By
Attorney Patented July 31, 1928.

1,678,757

UNITED STATES PATENT OFFICE.

ALEXANDER ABRAMSON, OF PRAGUE, CZECHOSLOVAKIA.

POWER-TRANSMISSION MECHANISM FOR THE DRIVING WHEELS OF MOTOR VEHICLES.

Application filed April 18, 1927, Serial No. 184,799, and in Czechoslovakia September 18, 1926.

This invention relates to a power transmission mechanism having a limited free movement for use as differential gear especially in motor cars, wherein the adjacent ends of the half axles are provided with abutments or drivers on which operates a driving pin mounted in the driving casing. The object of the invention is to arrange this transmission mechanism, which allows a limited amount of free movement of one or the other of the half axles, in such a manner that when one of the half axles is beginning to run free the other half axle is coupled with the driving casing. The essential feature of the invention consists in the arrangement wherein a locking element of a pin rotatably mounted in the driving casing has a semi-circular cross-section, the flattened side of which lies opposite the inclined sides of angular recesses of the adjacent drivers at the abutting ends of the half axles, so that this pin lies in both these recesses, when the half axles run at the same speed of revolution. When either of the half axles begins to run freely this causes the pin to turn against the action of a spring in such a manner that it will lie entirely within the recesses of the driver remaining operative, thus establishing the coupling of this driver to the driving gear casing.

The accompanying drawings show by way of example a form of the transmission mechanism in accordance with this invention. Figure 1 shows a cross section of the device, Figure 2 a section on line x—x of Figure 1, Figure 3 a section on line y—y of Figure 1, Figures 4 and 5 are sections on line z—z of Figure 2 and show the coupling pin in different positions, Figure 6 is a longitudinal section, partly on an enlarged scale, of the coupling pin and Figures 7 and 8 are schematic views showing the manner in which the driving pin, the abutments or drivers of the half axles and the coupling pin cooperate when the half axles run at the same speed of revolution and when one half axle commences to run freely.

The driving half axles 1, 1' are provided at their adjacent ends with abutments or driving members 7, 7', which through the medium of the common driving pin 6 are caused to participate in the rotation of the casing 10 having the driving bevel gear 3 mounted thereon.

The casing 10 has a spring-controlled pin 20 rotatably mounted therein. The upper end 21 of this pin is axially recessed at 22 and on the annular edge formed by this recess there is provided an angular slot 23 against the end faces of which abut the ends of a spring 25. This spring is held in the desired position by a stud 26. The stud 26 is arranged on the cover 27, which is screwed on the flange 28 of the casing 10 and maintains the pin 20 in rotatable position.

The lower end 29 of the pin 20 has a semi-circular cross-section and projects in angular recesses 30, 30' formed in the drivers 7, 7'.

The driving pin 6 is secured on the gear casing by the fastener strip 31 (Fig. 3).

The above described device operates as follows:

The usual position of the pin 20 and end portions 24 of the spring is shown in Figures 4 and 7. In this position both half-axles run at the same speed of revolution and the driving pin 6 is in engagement with both drivers 7, 7' simultaneously. The lower end 29 of the pin 20 is then held by the pressure of the spring 25 in the position shown in Figure 7 and engages simultaneously in both recesses 30, 30' provided in the drivers 7, 7' of the half-axles. The spring 25 maintains this position of the pin 20 as far as the pressure of said spring is not overcome by the frictional resistance in running.

When in describing a curve, the half-axle 1 commences to run freely (Figure 8) the inclined side 32 of the recess 30 comes against the edge of the flattened side of the pin portion 29 and the pin 20 is caused to turn to the position shown in Figure 8 (Figure 2 represents the reverse case when the half-axle 1' is running freely). As a result of this position of the pin 20 (Fig. 8) the half-axle 1' and its driver 7' are coupled with the driving casing. Immediately the half-axles 1 and 1' begin to run at the same speed of revolution, the drivers 7, 7' of the half-axles occupy again such a position that the recesses 30, 30' lie opposite each other and the spring 25, the end portions of which were previously occupying the position shown in Figure 5, causes the pin to return to the position shown in Figure 7.

Under the influence of the spring 25 the pin is maintained again in this position up to the moment when this pin will be turned anew by the driver 7 or 7'.

When the motor is stopped the pin 20 with its end portion 29, prevents the drivers 7, 7' from rotating under the influence of the inertia of the vehicle to such an extent as to approximately complete a full revolution up to the next impact on the driving pin 6. The drivers 7, 7' and their half-axles 1, 1' are permitted to rotate up to the moment only when the inclined sides 32, 32' of the recesses 30, 30' will come, against the end 29 of the pin, but not any longer.

In the same manner during the backing of the car, the driving pin 6 is not permitted to effect an approximately complete revolution so as to abut against the members 7, 7' of the half-axles 1, 1'. During the backing the lower end 29 of the pin 20, coming against the inclined sides 32, 32' of the angular recesses of the drivers 7, 7', limits angular recesses 30, 30' in the free rotation of the driving casing. Then the half-axles are not caused to rotate during the backing of the car, by the cooperation of the driving pin 6 with the drivers 7, 7', but by the cooperation of the portion 29 of the pin with the sides 32, 32' of the drivers 7, 7'.

Having now particularly described and ascertained the nature of my said invention and in what manner the same is to be performed, I declare that what I claim is:

1. A transmission and differential mechanism comprising a casing rotatably mounted and having a driving gear mounted thereon to rotate therewith; half axles associated with said casing; a driving member on the end of each axle and arranged adjacent each other in said casing, each driving member having an angular recess therein; a spring-controlled pin rotatably mounted in said casing and having a semi-circular lower end which projects into the recess in the driving members; and a driving pin mounted in said casing against which the driving members are adapted to abut to drive the casing and gear by means of the axles.

2. A transmission and differential mechanism comprising a casing rotatably mounted and having a driving gear mounted thereon to rotate therewith; a pair of half axles associated with said casing; a driving member on the inner end of each axle and arranged adjacent each other in said casing, each driving member having a cooperating recess therein; a spring-controlled pin rotatably mounted in said casing and having a lower end which projects into the recesses in the driving members; and a driving pin mounted in said casing against which at least one of the driving members is adapted to abut to drive the casing and gear by means of the axles.

3. A transmission and differential mechanism comprising a casing rotatably mounted and having a driving gear mounted thereon to rotate therewith; a pair of half axles associated with said casing and having abutting end members, each member having a cooperating recess therein; a pin rotatably mounted in said casing and adapted to project into the recesses; and a driving pin mounted in said casing against which said members are adapted to abut to drive the casing and gear by means of the axles.

4. A transmission and differential mechanism comprising a casing rotatably mounted and having a driving gear mounted thereon to rotate therewith; a pair of half axles associated with said casing and having abutting end members, each member having a cooperating recess therein; a spring-controlled pin rotatably mounted in said casing and adapted to project into the recesses; and a driving pin mounted in said casing against which said members are adapted to abut to drive the casing and gear by means of the axles.

5. A transmission and differential mechanism comprising a casing rotatably mounted and having a driving gear mounted thereon to rotate therewith; a pair of half axles associated with said casing; a driving member on the end of each axle and arranged adjacent each other in said casing, each driving member having a cooperating recess therein; a pin rotatably mounted in said casing and having a semi-circular lower end which projects into the recesses in the driving members and an axial recess in the other end of the pin; a spring in the recess of the pin to normally keep the pin in position in both of the recesses in the driving members; and a driving pin mounted in said casing against which the driving members are adapted to abut to drive the casing and gear by means of the axles.

6. A transmission and differential mechanism comprising a casing rotatably mounted and having a driving gear mounted thereon to rotate therewith; a pair of half axles associated with said casing; a driving member on the end of each axle and arranged adjacent each other in said casing, each driving member having a cooperating recess therein; a pin rotatably mounted in said casing and having a semi-circular lower end which projects into the recesses in the driving members and an axial recess in the other end of the pin; a stud mounted on the casing; a spring mounted in the recess of the pin and retained in position by said stud, said spring normally keeping the pin in position in both of the recesses in the driving members; and a driving pin mounted in said casing against which the driving members are adapted to abut to drive the casing and gear by means of the axles.

7. A transmission and differential mechanism comprising a casing rotatably mounted and having a driving gear mounted thereon to rotate therewith; a pair of half axles associated with said casing; a driving member on the end of each axle and arranged adjacent each other in said casing, each driving member having a cooperating recess therein; a pin rotatably mounted in said casing and having a semi-circular lower end which projects into the recesses in the driving members and an axial recess in the other end of the pin; a stud mounted on the casing; a spring mounted in the recess of the pin and retained in position by said stud, said spring normally keeping the pin in position in both of the recesses in the driving members; and means for forming a driving connection between the casing and the driving members.

8. A transmission and differential mechanism comprising a casing rotatably mounted and having a driving gear mounted thereon to rotate therewith; a pair of half axles associated with said casing and having abutting end members, each member having a cooperating recess therein; a pin rotatably mounted in said casing and adapted to project into the recesses; and means for forming a driving connection between the casing and the driving members.

In testimony whereof I affix my signature.

ALEXANDER ABRAMSON.